United States Patent Office 3,449,374
Patented June 10, 1969

3,449,374
FURYL KETOXIME AND FURALDOXIME-PHOSPHORUS PENTAFLUORIDE COMPLEXES
Mervin E. Brokke, Richmond, Calif., and George E. Lukes, deceased, late of El Cerrito, Calif., by John Hazzard, administrator, Kentfield, Calif., and Duane R. Arneklev, Sunnyvale, Calif., assignors to Stauffer Chemical Company, New York, N.Y., a corporation of Delaware
No Drawing. Original application Apr. 20, 1965, Ser. No. 450,265, now Patent No. 3,375,277, dated Mar. 26, 1968. Divided and this application Jan. 19, 1968, Ser. No. 729,830
Int. Cl. C07f 9/06; A01n 9/36
U.S. Cl. 260—347.7    2 Claims

ABSTRACT OF THE DISCLOSURE

Furyl ketoxime and furaldoxime-phosphorus pentafluoride complexes which are herbicides are disclosed.

---

This application is a division of copending application Ser. No. 450,265, filed Apr. 20, 1965 now Patent No. 3,375,277.

This invention relates to certain new and novel organic compounds which may be used as effective herbicides. More specifically, this invention relates to complex addition products of phosphorus pentafluoride and certain substituted oximes as represented by the following formula

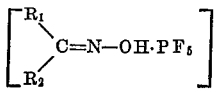

wherein $R_1$ is selected from the group consisting of lower alkyl radicals containing from 1 to 6 carbon atoms, inclusive, phenyl and furyl, and $R_2$ is selected from the group consisting of hydrogen, lower alkyl radicals containing from 1 to 6 carbon atoms, inclusive, phenyl, and $R_1$ and $R_2$ jointly are a divalent alkylene radical containing up to 5 carbon atoms.

It has been found that the new and novel compounds of the present invention are particularly effective as herbicides. They are effective in the control of grasses and broadleaf plants exhibiting both pre-emergence and post-emergence activity.

The compounds of the present invention can be prepared by various methods. Initially the oxime can be prepared by the condensation of various aldehydes and ketones and hydroxylamine. These condensation derivatives are known as aldoximes or hetoximes depending upon the nature of the carbonyl component. Therefore, by oxime we mean both the condensation products obtained from an aldehyde or a ketone and hydroxylamine. One method of forming the complex-addition product of said oximes is by contacting the appropriate oxime under anhydrous conditions with gaseous phosphorus pentafluoride in a cooled normally inert liquid organic solvent, such as benzene, toluene, and the like. The compounds can be obtained in very high yields and technical purity.

Although the exact nature of the phosphorus pentafluorideamine products of the present invention have not as yet been fully determined, the evidence gathered thus far indicates them to be a type of addition product, since their formation is not accompanied by the elimination or formation of any detectable by-products. In lieu of more substantial evidence as to the exact nature of the instant compounds any further discussion along theoretical lines of possible structure will be foregone. It should be pointed out, however, that the formulation of the compounds of the present invention are not promiscuous, but instead are discrete compositions.

The method of preparing typical compounds of the present invention, as well as the manner of using them in herbicidal compositions, are illustrated in the following examples.

Example 1.—Preparation of acetoxime-phosphorus pentafluoride complex.

Acetoxime (14.6 g., 0.2 mol) was dissolved in 125 ml. of anhydrous benzene. The solution was cooled with an ice bath saturated with phosphorus pentafluoride gas. A white crystalline solid separated and was washed with benzene. There was obtained 23.5 g. of the complex. The material was very hygroscopic. Analysis confirmed the expected compound.

Example 2.—Preparation of 2-furaldoxime-phosphorus pentafluoride complex.

2-furaldoxime (11.1 g., 0.1 mol) was dissolved in 100 ml. of anhydrous benzene. The resulting solution was cooled with an ice bath and saturated with phosphorus pentafluoride gas. The product was collected and determined to be the corresponding 1:1 adduct with a melting point of 70–73° C.

*Analysis.*—Calculated for $C_5H_5F_5O_2NP$ (percent): C, 25.2; F, 40.0; P, 13.1. Found: C, 25.3; F, 41.2; P, 12.7.

The following is a table of representative complexes prepared according to the aforedescribed procedures. Compound numbers have been assigned to each compound and are used throughout the balance of the application.

TABLE $$\begin{bmatrix} R_1 \\ \phantom{R_1}\diagdown \\ \phantom{R_1 R_2}C{=}N{-}OH\cdot PF_5 \\ \phantom{R_1}\diagup \\ R_2 \end{bmatrix}$$

| Compound No. | $R_1$ | $R_2$ | M.P. or $n_D^{30}$ |
|---|---|---|---|
| 1[1] | Methyl | Methyl | Hygroscopic solid. |
| 2 | Phenyl | Hydrogen | Semi-solid. |
| 3 | n-Hexyl | do | 1.4090. |
| 4 | Pentamethylene | | 99–102°. |
| 5[1] | Furyl | Hydrogen | 70–73°. |

[1] No. 1 prepared in Example 1. No. 5 prepared in Example 2.

As previously mentioned, the herein described novel compositions produced in the above-described manner are phytotoxic compounds which are useful and valuable in controlling various plant species. The compounds of this invention were tested as herbicides in the following manner.

Pre-emergence herbicide test.—The seeds of crab grass, foxtail, wild oats and watergrass were planted in individual rows one-half inch deep in Santa Cruz sandy loam soil contained in compressed paper flats 8¼" x 6½" which are 2¾" deep. Enough seeds were planted to give about thirty to fifty plants each of the plant species in each flat. The flats were watered after planting. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats.

Compounds 1, 4 and 5 displayed 85 to 100% control by severe injury or death to crab grass, foxtail and watergrass. Compound 1 also exhibited effective control of wild oats and Compound 4 gave 55 to 65% control of the weed. Compound 3 controlled crab grass and foxtail at a rating level of 55 to 65% and Compound 2 gave moderate control (25 to 35%) of crab grass, foxtail and wild oats at the test concentration employed. On further evaluation as a pre-emergence herbicide at a rate of 2 lbs./acre, Compound 4 gave 80 to 100% control of crab grass, foxtail, watergrass, wild oats and pigweed.

Post-emergence herbicide test.—Seeds of crab grass, pinto bean, curly dock, wild oats, mustard and watergrass were planted in flats as used in the pre-emergence testing. The plants were allowed to emerge from the soil and develop to 3 to 6 inches in height. Thereafter, the compound under test is applied to the foliage by means of an overhead spray while the flat moves under the spray on a moving belt. A concentration of 0.5% of active compound in the spray was used at a rate of approximately 20 lbs./acre. Two weeks later the injury was rated and recorded.

In their employment as post-emergence herbicides the compounds of the present invention gave the following typical results; Compounds 1 and 5 displayed 85 to 100% control of the weeds crabgrass, watergrass, mustard and curly dock. Compound 3 gave 85 to 100% control of mustard and 55 to 65% control of crab grass and curly dock. At the rate tested, Compounds 2 and 4 gave moderate control of crab grass and mustard.

The compounds of the present invention may be used as pre-emergence or post-emergence herbicides and may be applied in a variety of ways at various concentrations. In practice the compounds are usually formulated with an inert herbicidal adjuvant, utilizing methods well-known to those skilled in the art, thereby making them suitable for application as dusts, sprays or drenches. The amount applied will depend upon the nature of the seeds or plants to be controlled and the rate of application may vary from 1 to 80 pounds per acre. One particularly advantageous way of applying the herbicidal composition comprising the adjuvant and an effective amount of a compound of the present invention is as a narrow band along a row crop, straddling the row.

Various changes and modifications may be made without departing from the spirit and scope of the invention described herein as will be apparent to those skilled in the art to which it pertains.

We claim:
1. A compound of the formula

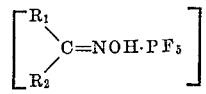

wherein $R_1$ is furyl and $R_2$ is selected from the group consisting of hydrogen, lower alkyl radicals containing from 1 to 6 carbon atoms, inclusive, and phenyl.

2. The compound, 2-furaldoxime-phosphorus pentafluoride complex.

References Cited

Abstract of Al-Komser et al., Chem. Abstracts, vol. 60 (1964), p. 182.

ALEX MAZEL, *Primary Examiner.*

BERNARD I. DENTZ, *Assistant Examiner.*